(12) United States Patent
Jang et al.

(10) Patent No.: US 9,422,474 B2
(45) Date of Patent: Aug. 23, 2016

(54) CORE/SHELL MULTIFUNCTIONAL MAGNETIC NANOPHOSPHOR HAVING CORE/SHELL STRUCTURE AND SYNTHETIC METHOD THEREOF

(71) Applicant: KOREA INSTITUTE OF SCIENCE AND TECHNOLOGY, Seoul (KR)

(72) Inventors: Ho Seong Jang, Seoul (KR); Kyoungja Woo, Seoul (KR); Kipil Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 631 days.

(21) Appl. No.: 13/869,453

(22) Filed: Apr. 24, 2013

(65) Prior Publication Data
US 2013/0287703 A1  Oct. 31, 2013

(30) Foreign Application Priority Data

Apr. 27, 2012  (KR) .................. 10-2012-0044865

(51) Int. Cl.
| A61K 9/14 | (2006.01) |
| C09K 11/77 | (2006.01) |
| C09K 11/02 | (2006.01) |
| B82Y 40/00 | (2011.01) |
| B82Y 20/00 | (2011.01) |

(52) U.S. Cl.
CPC ............ *C09K 11/7773* (2013.01); *C09K 11/02* (2013.01); *B82Y 20/00* (2013.01); *B82Y 40/00* (2013.01); *Y10S 977/773* (2013.01); *Y10S 977/892* (2013.01); *Y10S 977/896* (2013.01); *Y10S 977/93* (2013.01); *Y10S 977/948* (2013.01); *Y10S 977/95* (2013.01); *Y10T 428/2982* (2015.01)

(58) Field of Classification Search
CPC .................................................. C09K 11/7773
See application file for complete search history.

(56) References Cited

FOREIGN PATENT DOCUMENTS

| JP | 2002020745 A | 1/2002 |
| JP | 2005104980 A | 4/2005 |
| JP | 2005526883 A | 9/2005 |
| JP | 2007523754 A | 8/2007 |
| JP | 2010072933 A | 4/2010 |

OTHER PUBLICATIONS

Guo, Seed-mediated synthesis of NaYF4:Yb,Er/NaGdF4 nanocrystals with improved upconversion fluorescence and MR relaxivity, Nanotechnology, 2010, 21, 125602.*
Wang, Simultaneous phase and size control of upconversion nanocrystals through lanthanide doping, Nature, 2010, 463, 1061-1065.*
H.S. Kiliaan, et al; "Energy Transfer in the Luminescent System Na(Y,Gd)F4:Ce,Tb", J. Electrochem. Soc. vol. 134, Issue 9, pp. 2359-2364; Dec. 1987.
Congcong Mi, et al; "Synthesis of surface amino-functionalized NaGdF4:Ce,Tb nanoparticles and their luminescence resonance energy transfer (LRET) with Au nanoparticles", Colloids and Surfaces A: Physicochemical and.Engineering Aspects, vol. 395, pp. 152-156, Available online Dec. 16, 2011.
KIPO Office Action dated Sep. 25, 2013; Appln. No. 10-2012-0044865.
Hao-Xin Mai, et al; "Size- and Phase-Controlled Synthesis of Monodisperse NaYF:Yb,Er Nanocrystals from a Unique Delayed Nucleation Pathway Monitored with Upconversion Spectroscopy", The Journal of Physical Chemistry, vol. 111, Issue 37, Sep. 20, 2007, pp. 13730-13739.
Karl W. Krmer, et al; "Hexagonal Sodium Yttrium Fluoride Based Green and Blue Emitting Upconversion Phosphors", Chemistry of Materials, vol. 16, Issue 7, pp. 1244-1251; Web Publication Date: Mar. 2, 2004.
Franois Auzel; "Upconversion and Anti-Stokes Processes with f and d Ions in Solids", Chemical Reviews, vol. 104, Issue 1, Web Publication Date: Nov. 18, 2003, pp. 139-174.

* cited by examiner

*Primary Examiner* — Paul Dickinson
(74) *Attorney, Agent, or Firm* — Ladas & Parry LLP (57) ABSTRACT

The present invention relates to a nanophosphor and a synthesis method thereof, and provides a nanophosphor comprising a first compound of Formula 1, wherein the first compound is fluoride-based one which is co-doped with $Ce^{3+}$ and $Tb^{3+}$.

$$NaGd_{1-p-q-r}M_rF_4:Ce^{3+}{}_p,Tb^{3+}{}_q \qquad (1)$$

In the Formula 1, descriptions on the p, q, r and M are overlapped with what was described in the detailed description of the present invention, so their concrete description are omitted. The nanophosphor has good light emission intensity and magnetic property as well as up-conversion and/or down-conversion property able to emit visible light after excitation by infrared and/or ultraviolet rays, so can be applied to a contrast agent and a counterfeit prevention code.

14 Claims, 8 Drawing Sheets

CORE/SHELL MULTIFUNCTIONAL MAGNETIC NANOPHOSPHOR HAVING CORE/SHELL STRUCTURE AND SYNTHETIC METHOD THEREOF

RELATED APPLICATION

This application claims the benefit of priority to Korean Patent Application No. 10-2012-0044865, filed on Apr. 27, 2012, which is hereby incorporated by reference for all purposes as if fully set forth herein.

BACKGROUND OF THE INVENTION

1. Field of the Invention

The present invention relates to nanophosphor and synthesis method thereof, and particularly to fluoride-based dual-mode emission nanophosphor which can be excited by infrared (IR) rays and ultraviolet (UV) rays to emit visible light and can have magnetic property, and synthesis method thereof. The nanophosphor can be used as contrast agent for magnetic resonance imaging or fluorescent imaging agent and applied to counterfeit prevention code and solar cell.

2. Background of the Invention

Different from semiconductor nanocrystals, light emitting nanoparticles doped with lanthanide elements have a characteristic that the peak positions of emission spectrum does not change even though its particle diameter is altered.

This is because light emission of the nanoparticles doped with lanthanide elements, namely nanophosphor, is generated by 4f electron transition of the lanthanide element such as 4f-4f or 4f-5d transition. Therefore, when using light emitting nanoparticles doped with lanthanide elements, there is an advantage that even though the particle diameter is adjusted diversely, it is possible to keep desired emission wavelength.

The light emission of nanophosphors occurs mostly when they are excited by ultraviolet rays or visible rays. However according to types of element to be doped with, it is possible to synthesize nanophosphor emitting visible light after excitation by IR rays.

Fluoride-based nanophosphor co-doped with Ytterbium (Yb) and Erbium (Er) shows emission peaks in green and red spectrum range after excitation by IR rays. In this case, as IR ray having low energy is converted to visible light having high energy, this is referred as up-conversion emission, distinguished from down-conversion emission to emit visible light via energy loss process after excitation by UV rays [Chem. Rev. vol. 104, 139-174 (2004)].

When using this up-conversion emission in applying it to fluorescent imaging agent, the penetrating depth of excited light into a cell becomes deeper and clear signal can be obtained as the excited light, IR rays, induces no self-light emission.

Especially, $NaYF_4$ is known as the most efficient host compound displaying up-conversion [Chem. Mater. vol. 16, 1244-1251 (2004)]. $NaYF_4$:Yb,Er nanophosphor shows up-conversion emission via absorption of near IR rays by ytterbium and energy transfer to erbium, so it shows very high efficiency than up-conversion emission by two photon absorption. Due to the above-mentioned difference of light emitting implement, there is no need to high price pulse type laser device and it is possible to display up-conversion emission with low price diode laser.

However, $NaYF_4$ shows polymorphism of cubic alpha ($\alpha$) phase and hexagonal beta ($\beta$) phase, which has a feature that the beta ($\beta$) phase shows better emission than the alpha ($\alpha$) phase. In this case, as extremely high synthesis temperature is needed to obtain the beta ($\beta$) phase, which makes diameter of particles to be synthesized larger and induces clustering among particles, there is a demerit that it is not suitable for biological applications [J.Phys. Chem. C vol. 111, 13730-13739 (2007)]. In case that the particle diameter is made smaller by adjusting synthesis condition to overcome this problem, another problem that surface defect increases and the emission intensity drops rapidly occurs.

Therefore, there is an urgent requirement to develop nanoparticles with smaller diameter as well as display of strong up-conversion emission or develop multifunctional nanoparticles able to produce another signals as well as up-conversion emission.

Furthermore, if it was possible to obtain various signals such as down-conversion emission and magnetic properties other than up-conversion emission, the properties as contrast agent could be improved largely.

SUMMARY OF THE INVENTION

An object of the present invention is to provide fluoride-based dual-mode emission nanophosphor which can be excited by infrared rays and ultraviolet rays to emit visible light and can have magnetic property, and synthesis method thereof. The nanophosphor is applicable to contrast agent for MRI or fluorescent imaging agent and can be applied to sensor, counterfeit prevention code, and solar cell as a multifunctional material having all of magnetic property, up-conversion emission property, and down-conversion emission property at a time.

In one aspect, the nanophosphor according to the present invention comprises a first compound of Formula 1, wherein the first compound is fluoride-based one which is co-doped with $Ce^{3+}$ and $Tb^{3+}$.

$$NaGd_{1-p-q-r}M_rF_4:Ce^{3+}_p,Tb^{3+}_q \qquad (1)$$

In the Formula 1, p is a real number in the range of $0.01 \leq p \leq 0.5$; q is a real number in the range of $0.001 \leq q \leq 0.35$; r is a real number in the range of $0 \leq r < 1$; and $0.011 \leq p+q+r < 1$; M is one selected from the group consisting of Y, La, Pr, Nd, Pm, Sm, Eu, Dy, Ho, Er, Tm, Yb, Lu, and combination thereof.

In the Formula 1, p is a real number in the range of $0.01 \leq p \leq 0.2$; q is a real number in the range of $0.001 \leq q \leq 0.2$. When p and q are in those range, efficiency of energy transfer from Ce to Tb will be high by minimizing concentration quenching effect.

The nanophosphor may comprise a core which comprises nanoparticles comprising a second compound of Formula 2, and a shell which comprises the first compound and covers the core, wherein the second compound is fluoride-based one which is co-doped with $Yb^{3+}$ and $Er^{3+}$.

$$NaY_{1-w-z-x-y}Gd_wL_zF_4:Yb^{3+}_x,Er^{3+}_y \qquad (2)$$

In the Formula 2, x is a real number in the range of $0.1 \leq x \leq 0.9$; y is a real number in the range of $0 < y \leq 0.1$; and $0.1 < x+y \leq 1$; w is a real number in the range of $0 \leq w \leq 1$; z is a real number in the range of $0 \leq z \leq 1$; and $0.1 < x+y+w+z \leq 1$; L is one selected from the group consisting of lanthanide elements and combination thereof.

The nanophosphor may be 1~50 nm in diameter.

The nanoparticle included in the core may have hexagonal structure.

The first compound included in the shell may have crystalline structure.

The core may be 1~30 nm in diameter.

The nanophosphor may have down-conversion light emission properties and up-conversion light emission properties.

In another aspect, the method for preparing a nanophosphor according to the present invention comprises: (a) preparing a first solution comprising gadolinium precursors, cerium precursors, terbium precursors, and oleic acid salts; (b) preparing a second solution comprising lanthanide complexes by heat treatment of the first solution; (c) preparing a first reaction solution by mixing a forth solution with sodium precursors and fluorine precursors, wherein the forth solution is prepared by blending a third solution comprising oleic acid and 1-octadececen and a mixture comprising the second solution ; and (d) preparing nanophosphors comprising a first compound of Formula 1 by heat treatment of the first reaction solution.

$$NaGd_{1-p-q-r}M_rF_4:Ce^{3+}{}_p,Tb^{3+}{}_q \quad (1)$$

In the Fomula 1, p is a real number in the range of $0.01 \leq p \leq 0.5$; q is a real number in the range of $0.001 \leq q \leq 0.35$; r is a real number in the range of $0 \leq r < 1$; and $0.011 \leq p+q+r < 1$; M is one selected from the group consisting of Y, La, Pr, Nd, Pm, Sm, Eu, Dy, Ho, Er, Tm, Yb, Lu, and combination thereof.

The forth solution in the step (c) may further comprise nanoparticles.

The nanoparticle may comprise a second compound of Formula 2 and be prepared by a method comprising: (e) preparing a fifth solution comprising yttrium precursors, ytterbium precursors, erbium precursors, oleic acid, and 1-octadecene; (f) preparing a sixth solution comprising lanthanide complex compounds by heating the fifth solution; (g) preparing a second reaction solution by mixing the sixth solution and a seventh mixed solution comprising sodium precursors and fluorine precursors; and (h) forming nanoparticles comprising a second compound of Formula 2 by heat treatment of the second reaction solution, wherein the second compound is fluoride-based one which is co-doped with $Yb^{3+}$ and $Er^{3+}$.

$$NaY_{1-w-z-x-y}Gd_wL_zF_4:Yb^{3+}{}_x,Er^{3+}{}_y \quad (2)$$

In the Fomula 2, x is a real number in the range of $0.1 \leq x \leq 0.9$; y is a real number in the range of $0 < y \leq 0.1$; and $0.1 < x+y \leq 1$; w is a real number in the range of $0 \leq w \leq 1$; z is a real number in the range of $0 \leq z \leq 1$; and $0.1 < x+y+w+z \leq 1$; L is one selected from the group consisting of lanthanide elements and combination thereof.

The heat treatment in the step (d) may be performed at 200~370° C.

The gadolinium precursor may be one selected from the group consisting of gadolinium acetate ($Gd(CH_3COO)_3$), gadolinium chloride ($GdCl_3$), gadolinium chloride hexahydrate ($GdCl_3.6H_2O$) and combination thereof.

The cerium precursor may be one selected from the group consisting of cerium acetate ($Ce(CH_3COO)_3$), cerium chloride ($CeCl_3$), cerium chloride heptahydrate ($CeCl_b.7H_2O$) and combination thereof.

The terbium precursor may be one selected from the group consisting of terbium acetate ($Tb(CH_3COO)_3$), terbium acetate tetrahydrate ($Tb(CH_3COO)_3.4H_2O$), terbium chloride ($TbCl_3$), terbium chloride hexahydrate ($TbCl_3.6H_2O$), and combination thereof.

The first solution may further comprise a lanthanide precursor selected from the group consisting of Y, La, Pr, Nd, Pm, Sm, Eu, Dy, Ho, Er, Tm, Yb, Lu and combination thereof.

In another aspect, the contrast agent according to the present invention comprises the nanophosphor and the contrast agent may be fluorescence or magnetic resonance imaging (MRI) contrast agent.

In another aspect, the infrared ray sensor according to the present invention comprises the nanophosphor.

In another aspect, the counterfeit prevention code according to the present invention comprises the nanophosphor.

In another aspect, the solar cell according to the present invention comprises the nanophosphor.

Unless stated otherwise in the present invention, the lanthanide elements mean elements classified into lanthanides on the periodic table of elements, and concretely mean one selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

In the present invention, although the terms including ordinal numbers such as the first and the second can be used for explaining various constituents, the above constituents are not limited to the above terms and the above terms are used only for the purpose of distinguishing one constituent from the other constituent.

BRIEF DESCRIPTION OF THE DRAWINGS

FIG. 6 (a) is a photo showing nanophosphor dispersed solution in the Example 1, (b) is a photo showing light emission using near infrared rays as an excitation source, and (c) is a photo showing light emission using ultraviolet rays as an excitation source.

DETAILED DESCRIPTION OF THE INVENTION

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

In one aspect, the nanophosphor according to the present invention comprises a first compound of Formula 1, wherein the first compound is fluoride-based one which is co-doped with $Ce^{3+}$ and $Tb^{3+}$.

$$NaGd_{1-p-q-r}M_rF_4:Ce^{3+}{}_p,Tb^{3+}{}_q \quad (1)$$

In the Formula 1, p is a real number in the range of $0.01 \leq p \leq 0.5$; q is a real number in the range of $0.001 \leq q \leq 0.35$; r is a real number in the range of $0 \leq r < 1$; and $0.011 \leq p+q+r < 1$; M is one selected from the group consisting of Y, La, Pr, Nd, Pm, Sm, Eu, Dy, Ho, Er, Tm, Yb, Lu, and combination thereof.

The q represents amount of Tb, wherein when the q is less than 0.001, it may be difficult to obtain green light emission, and when the q is over 0.35, it may be impossible to express strong light emission due to concentration quenching. The p represents amount of Ce which is a co-doping agent, wherein when the p is less than 0.01, absorption of excitation light may be insufficient, and when the p is over 0.5, energy transfer efficiency may decrease by concentration quenching.

The p may be same to or larger than the q. The case that the p is same to or larger than the q means that the amount of Ce included is larger than that of Tb. In this case, it is possible to make the nanophosphor absorb the excitation light sufficiently by the co-doping agent.

In the Formula 1, the p may be a real number in the range of $0.01 \leq p \leq 0.35$, and the q may be a real number in the range of $0.001 \leq q \leq 0.3$. When the p and the q are set within the above ranges, it is possible to obtain strong light emission by minimizing emission decrease from concentration quenching and increasing energy transfer efficiency from Ce to Tb.

Figure 1:
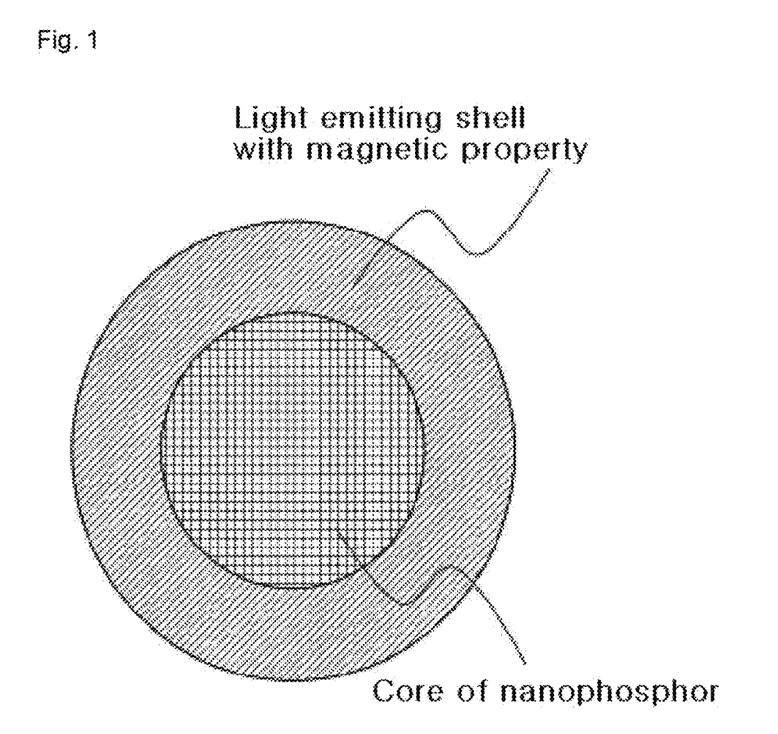
FIG. 1 is a scheme showing a section of nanophosphor when the nanophosphor of the present invention has a core/shell structure.

The nanophosphor may have a core/shell structure comprising a core and a shell covering the core. FIG. 1 is a scheme showing a section of nanophosphor having a core/shell structure according to the present invention. Referring to the FIG. 1, the nanophosphor may consist of a core and a shell covering the core.

When the nanophosphor has core/shell structure, it is possible for the core itself to have a light emitting property by making it comprise nanoparticles and to facilitate growth of the shell nanocrystal as the shell is grown from the core.

The nanophosphor may comprise a core which comprises nanoparticles comprising a second compound of Formula 2, and a shell which comprises the first compound and covers the core, wherein the second compound is fluoride-based one which is co-doped with $Yb^{3+}$ and $Er^{3+}$.

$$NaY_{1-w-z-x-y}Gd_wL_zF_4:Yb^{3+}{}_x,Er^{3+}{}_y \quad (2)$$

In the Formula 2, x is a real number in the range of $0.1 \leq x \leq 0.9$; y is a real number in the range of $0 < y \leq 0.1$; and $0.1 < x+y \leq 1$; w is a real number in the range of $0 \leq w \leq 1$; z is a real number in the range of $0 \leq z \leq 1$; and $0.1 < x+y+w+z \leq 1$; L is one selected from the group consisting of lanthanide elements and combination thereof.

In the Formula 2, the w may be a real number in the range of $0 < w \leq 1$, the z may be a real number in the range of $0 < z \leq 1$, and the w and z may be $0 < w+z \leq 1$.

In the Formula 2, the lanthanide elements may be one selected from the group consistng of La, Ce, Pr, Nd, Pm, Sm, Eu, Gd, Tb, Dy, Ho, Tm and Lu.

In the Formula 2, the x may be a real number in the range of $0.1 \leq x \leq 0.4$, the y may be a real number in the range of $0.001 \leq y \leq 0.05$, and the x and y may be $0.101 \leq x+y \leq 0.45$. In this case, as it is possible to increase the ratio of green light emission peaks against that of red light peaks in the light obtained from the nanophosphor, so excellent green light emission can be obtained.

The nanoparticles may be less than 30 nm in diameter, which may be 1~30 nm.

The nanoparticles may have hexagonal structure. When the $Yb^{3+}$ and $Er^{3+}$ co-doped fluoride-based nanoparticles represented in the Formula 2 have hexagonal structure, it is possible to obtain nanophosphors with strong light emission intensity.

The nanophosphor has core/shell structure, which comprises the core comprising nanoparticles containing the second compound represented in the Formula 2 and the shell comprising the first compound represented in the Formula 1. In this case, up-conversion light emission intensity of the nanophosphor can be increased, down-conversion green light emission can be obtained under excitation by UV rays, and it is possible to have magnetic property concomitantly.

Especially, the nanophosphor can obtain additional down-conversion light emission signal using UV rays as well as up-conversion using IR rays to make biological imaging by fluorescence in both mode possible. Therefore, when applying it as a contrast agent, it is possible to improve its accuracy, further. Due to magnetic property, it is possible to make image contrast stronger as a contrast agent for MRI, and it is also possible to get stronger and more accurate image signal. Furthermore, it is also possible to obtain images from deeper region of biological tissue by applying IR and UV rays optionally or simultaneously as occasion demands in applying it to biological tissue.

The nanophosphor may be less than 50 nm in diameter, which may be 1~50 nm. When the nanophosphor is within the above range of diameter, it is possible to prevent decline of luminance from unevenness of particle diameter.

The first compound included in the shell may have crystalline structure. When the first compound included in the shell has crystalline structure, it is possible to make the up-conversion light emission stronger.

The nanophosphor can be materialized as considerably small diameter even though it has the core/shell structure. Due to strong light emission in spite of its small diameter, it can be applied to not only in vitro applications such as cell study but also in vivo applications.

In addition, it can be included in an IR sensor or a UV sensor to provide a sensor with excellent sensitivity, it can be applied as counterfeit prevention code, and it can be included in a solar cell to increase efficiency of the solar cell.

In another aspect, the method for preparing a nanophosphor according to the present invention comprises: (a) preparing a first solution comprising gadolinium precursors, cerium precursors, terbium precursors, and oleic acid salts; (b) preparing a second solution comprising lanthanide complexes by heat treatment of the first solution; (c) preparing a first reaction solution by mixing a forth solution with sodium precursors and fluorine precursors, wherein the forth solution is prepared by blending a third solution comprising oleic acid and 1-octadecene and a mixture comprising the second solution; and (d) preparing nanophosphors comprising a first compound of Formula 1 by heat treatment of the first reaction solution.

$$NaGd_{1-p-q-r}M_rF_4:Ce^{3+}{}_p,Tb^{3+}{}_q \quad (1)$$

Descriptions on the p, q, r and M in the Formula 1, are overlapped with what was described in the above nanophosphor according to the present invention, so their concrete description are omitted. The step (a) comprises a process to prepare the first solution comprising gadolinium precursors, cerium precursors, terbium precursors, and oleic acid salts.

The first solution may further comprise one lanthanide precursor selected from the group consisting of Y, La, Pr, Nd, Pm, Sm, Eu, Dy, Ho, Er, Tm, Yb, Lu and combination thereof.

The gadolinium precursor may be one selected from the group consisting of gadolinium acetate ($Gd(CH_3COO)_3$), gadolinium chloride ($GdCl_3$), gadolinium chloride hexahydrate ($GdCl_3 \cdot 6H_2O$) and combination thereof.

The cerium precursor may be one selected from the group consisting of cerium acetate ($Ce(CH_3COO)_3$), cerium chloride ($CeCl_3$), cerium chloride heptahydrate ($CeCl_3 \cdot 7H_2O$) and combination thereof.

The terbium precursor may be one selected from the group consisting of terbium acetate ($Tb(CH_3COO)_3$), terbium acetate tetrahydrate ($Tb(CH_3COO)_3 \cdot 4H_2O$), terbium chloride ($TbCl_3$), terbium chloride hexahydrate ($TbCl_3 \cdot 6H_2O$), and combination thereof.

The oleic acid salt may be one selected from the group consisting of sodium oleate, potassium oleate, and combination thereof, what can form a complex by reacting with the lanthanide precursor is enough to be used, and preferably, the oleic acid salt may be sodium oleic acid.

The step (b) comprises a process to prepare the second solution comprising lanthanide complex compounds by heat treatment of the first solution. The lanthanide complex compounds comprise gadolinium oleate formed by reaction between the gadolinium precursor and the oleic acid salt, cerium oleate formed by reaction between the cerium precursor and the oleic acid salt, and terbium oleate formed by reaction between the terbium precursor and the oleic acid salt.

The step (c) comprises a process to prepare the first reactive solution by mixing a forth solution with sodium precursors and fluorine precursors, wherein the forth solution is prepared by blending a third solution comprising oleic acid and 1-octadececen and a mixture comprising the second solution The sodium precursors may be one selected from the group consisting of sodium hydroxide, sodium fluoride, sodium oleate, and combination thereof, and the fluorine precursors may be one selected from the group consisting of ammonium fluoride, sodium fluoride, and combinations thereof.

The forth solution may further comprise alcohol, which may be lower alcohol with 1~6 carbons and may be methanol.

The step (d) comprises a process to prepare nanophosphor by heat treatment of the first reactive solution. The heat treatment may be carried out under inactive gas condition.

In the step (d), temperature of the heat treatment to prepare nanophosphor from the first reactive solution may be 200~370° C., When the temperature of heat treatment is below 200° C., nanocrystals in beta (β) phase may not be formed completely, accordingly intensity of the up-conversion light emission may be weakened. When the temperature of heat treatment is over 370° C., clustering among the nanophosphors to be formed may occur, their diameter may be enlarged, and evenness in their diameter may decrease.

Time required for the heat treatment may be 30 min~4 hr. When the time of heat treatment is less than 30 min, crystal formation in the nanophosphors may be insignificant, and when the time exceeds 4 hr, the diameter of nanophosphors may be enlarged because of clustering.

In case that the forth solution further comprises alcohol, the step (d) may further comprise a process to remove the alcohol prior to heat treatment of the first reactive solution.

In the step (c), the forth solution may further comprise nanoparticles included in the core. In case that the forth solution further comprises the nanoparticles, the core comprising the nanoparticles may be covered with the first compound to be included in the nanophosphor and the nanophosphor may have the core/shell structure.

The nanoparticles may comprise the second $Yb^{3+}$ and $Er^{3+}$ co-doped fluoride-based compound of Formula 2.

[Formula 2]

$$NaY_{1-w-z-x-y}Gd_wL_zF_4{:}Yb^{3+}{}_xEr^{3+}{}_y \qquad (2)$$

In the Formula 2, the descriptions on the x, y, w, z, and L are overlapped with what was described in the nanophosphor according to the present invention, so their concrete description are omitted.

When the forth solution further comprises the nanoparticles, it is possible to prepare nanophosphor having core/shell structure because the first compound forms a shell covering a core comprising the second compound. The nanoparticle may comprise a second compound of Formula 2 and be prepared by a method comprising: (e) preparing a fifth solution comprising yttrium precursors, ytterbium precursors, erbium precursors, oleic acid, and 1-octadecene; (f) preparing a sixth solution comprising lanthanide complex compounds by heating the fifth solution; (g) preparing a second reaction solution by mixing the sixth solution and a seventh mixed solution comprising sodium precursors and fluorine precursors; and (h) forming nanoparticles comprising a second compound of Formula 2 by heat treatment of the second reaction solution.

The step (e) may comprise a process to prepare the fifth solution comprising yttrium precursors, ytterbium precursors, erbium precursor, oleic acid, and 1-octadecene.

The fifth solution may further comprise gadolinium precursors. The yttrium precursor may be one selected from the group consisting of yttrium acetate ($Y(CH_3COO)_3$), yttrium chloride ($YCl_3$), yttrium chloride hexahydrate ($YCl_3 \cdot 6H_2O$), and combination thereof, the ytterbium precursor may be one selected from the group consisting of ytterbium acetate ($Yb(CH_3COO)_3$), ytterbium chloride ($YbCl_3$), ytterbium chloride hexahydrate ($YbCl_3 \cdot 6H_2O$), and combination thereof, the erbium precursor may be one selected from the group consisting of erbium acetate ($Er(CH_3COO)_3$), erbium chloride ($ErCl_3$), erbium chloride hexahydrate ($ErCl_3 \cdot 6H_2O$), and combination thereof; and the gadolinium precursor may be one selected from the group consistng of gadolinium acetate ($Gd(CH_3COO)_3$), gadolinium chloride ($GdCl_3$), gadolinium chloride hexahydrate ($GdCl_3 \cdot 6H_2O$) and combination thereof.

The step (f) may comprise a process to prepare the sixth solution comprising lanthanide complex compounds by heat treatment of the fifth solution.

Heating of the fifth solution may be carried out at 100~200° C. and may be carried out at 130~180° C. When the heating is carried out in the above temperature range, it is possible to make the complex compounds such as yttrium oleate, ytterbium oleate, erbium oleate, and gadolinium oleate dissolved well in oleic acid and 1-octadecene.

The step (g) may comprise a process to prepare the second reactive solution comprising the sixth solution and the seventh mixed solution comprising sodium precursors and fluorine precursors.

The sodium precursor may be one selected from the group consisting of sodium hydroxide, sodium fluoride, sodium oleate, and combination thereof. The fluorine precursor may be one selected from the group consisting of ammonium fluoride, sodium fluoride, and combination thereof. In the above, the sodium fluoride can act as both the sodium precursor and the fluorine precursor.

The seventh mixed solution may further comprise alcohol, which may be lower alcohol with 1~6 carbons and may be methanol.

The step (h) may comprise a process to form nanoparticles by heat treatment of the second reactive solution.

In case that the seventh solution further comprises alcohol, the step (h) may comprise a process to remove the alcohol prior to heat treatment of the first reactive solution.

The heat treatment in the step (h) may be carried out under inactive gas condition. The heat treatment may be carried out at 200~370° C. for 30 min~4 hr. When the heat treatment was accomplished within the above range of temperature and time, it is possible to obtain crystalline nanoparticles of beta phase with excellent up-conversion light emission property from appropriate light emission intensity, smaller particle diameter, and less clustering among nanoparticles.

The nanoparticles can be dispersed and stored in nonpolar solvent through cooling to room temperature and washing process. The nonpolar solvent may include hexane, toluene, and chloroform, but is not limited thereto.

The nanoparticles may be prepared by the nanoparticle preparation method, dispersed and stored in the nonpolar solvent, and included into the forth solution in state of dispersed in nonpolar solution.

In case of preparing the nanophosphor using the forth solution comprising the nanoparticles, it is possible to form the core comprising the nanoparticles and the shell on the surface of core by covering it.

In this case, when setting the temperature of heat treatment in the step (d) to 200~370° C., the shell of beta ($\beta$) phase can grow epitaxially on the surface of core, show stronger up-conversion light emission than the core, and have magnetic property as well as down-conversion light emission. In addition, in case that the above temperature of heat treatment exceeds 370° C., the shell precursors may form the core as well as the shell in forming the shell by covering the core, so formation of the shell may not be formed efficiently.

The synthesis method of nanophosphor of the present invention can have both strong up-conversion light emission property to emit visible light excited by IR ray (including near IR rays) and down-conversion light emission property to emit visible light excited by UV rays (near UV rays) as well as smaller diameter of the phosphor and can prepare nanophosphor having magnetic property also with simple method.

In another aspect, the contrast agent according to the present invention comprises the nanophosphor. The contrast agent may be fluorescent contrast agent or MRI contrast agent. The description is overlapped with what was described in the nanophosphor according to present invention, so its concrete description is omitted.

The contrast agent shows dual-mode emission property showing enough emission to apply to in vivo applications through excitation by IR and UV rays in spite of the smaller particle diameter of the nanophosphors, it is possible to increase contrast of biological image than conventional contrast agents and improve accuracy of imaging contrast agent. In addition, it is also possible to obtain images from deeper regions of biological tissues. Due to the magnetic property of the nanophosphor, it can be applied as MRI contrast agent.

In another aspect, the infrared ray sensor according to the present invention comprises the nanophosphor. Descriptions on the nanophosphor are the same in the above, and concrete explanation is omitted. The IR sensor can improve sensitivity by comprising the nanophosphor excited by IR rays and emitting light.

In another aspect, the counterfeit prevention code according to the present invention comprises the nanophosphor. Descriptions on the nanophosphor are the same in the above, and concrete explanation is omitted. The counterfeit prevention code has luminescence properties under the both invisible IR and UV rays concomitantly and has magnetic properties also, so can be applied to higher grade of security code by improving the security further. In addition, the nanophosphor has extremely fine particles in nano-unit and it is hardly detected with general method, so it can be applied to counterfeit prevention codes such as forgery prevention code.

In another aspect, the solar cell according to the present invention comprises the nanophosphor. Descriptions on the nanophosphor are the same in the above, and concrete explanation is omitted. The solar cell comprises the nanophosphor that can convert IR and UV rays unavailable in the solar cell to visible light available in the solar cell, so can contribute to improve efficiency of the solar cell.

EFFECTS OF INVENTION

The nanophosphor of the present invention has excellent emission properties, both up-conversion and down-conversion properties which can be excited by UV rays as well as IR ray to emit visible light, and magnetic property also. Thus when applying it as a contrast agent, it is possible to obtain strong image signals with high accuracy. In addition, it can be applied to IR or UV sensor and also used as higher grade security code. Furthermore, it can be included in the solar cell to increase efficiency of the solar cell.

The foregoing embodiments and advantages are merely exemplary and are not to be construed as limiting the present disclosure. The present teachings can be readily applied to other types of applications. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

PREPARATION EXAMPLE

Preparation of $\beta$-NaY$_{0.2}$Gd$_{0.6}$F$_4$:Yb$^{3+}_{0.18}$,Er$^{3+}_{0.02}$/$\beta$-NaGd$_{0.8}$F$_4$:Ce$^{3+}_{0.15}$, Tb$^{3+}_{0.05}$(Core/Shell) Structure Nanophosphor 1. Preparation of Yb$^{3+}$ and Er$^{3+}$ Co-Doped Fluoride-Based Nanoparticles (Core)

By mixing 0.2 mmol of yttrium chloride hexahydrate (YCl$_3$.6H$_2$O), 0.6 mmol of gadolinium hexahydrate (GdCl$_3$.6H$_2$O), 0.18 mmol of ytterbium chloride hexahydrate (YbCl$_3$.6H$_2$O), and 0.02 mmol of erbium chloride hexahydrate (ErCl$_3$.6H$_2$O) with 6 mL of solvent, oleic acid, and 15 mL of 1-octadecene, mixed solution was prepared (the 5$^{th}$ solution preparation step).

By heating the mixed solution to 150° C., the lanthanide compounds were dissolved in the solvent to form a transparent solution, so as to form a solution including lanthanide complex compound (complex compound formation step).

By adding a mixed solution containing 2.5 mmol of sodium hydroxide, 4 mmol of ammonium fluoride and methanol to the solution including lanthanide complex compound and stirring them with a magnetic stirrer, the reactive solution was prepared (the $2^{nd}$ reactive solution preparation step).

After removing methanol from the reactive solution, perform heat treatment of the methanol removed reactive solution under argon gas condition at 300° C. for 90 min. During the heat treatment, beta (β)-NaY$_{0.2}$Gd$_{0.6}$F$_4$:Yb$^{3+}$$_{0.18}$, Er$^{3+}$$_{0.02}$ nanoparticles were formed. The formed nanoparticles were washed with ethanol, dispersed and stored in hexane.

2. Preparation of Nanophosphor Having Core/Shell Structure by Forming a Shell with Ce$^{3+}$ and Tb$^{3+}$ Co-Doped Fluoride Compound.

By using the beta (β)-NaY$_{0.2}$Gd$_{0.6}$F$_4$:Yb$^{3+}$$_{0.18}$,Er$^{3+}$$_{0.02}$ nanoparticles prepared in the above 1. process as a core, nanophosphors including the first Ce$^{3+}$ and Tb$^{3+}$ co-doped fluoride-based compound were prepared.

By adding 0.8 mmol of gadolinium chloride hexahydrate (GdCl$_3$.6H$_2$O), 0.15 mmol of cerium chloride heptahydrate (CeCl$_3$.7H$_2$O), 0.05 mmol of terbium chloride hexahydrate (TbCl$_3$.6H$_2$O) and 3.1 mmol of sodium oleate (NaCl$_{18}$H$_{33}$O$_2$) to a mixed solution of water, ethanol and hexane and mixing them well, the first solution was prepared.

By performing heat treatment of the solution at 60° C. for 4 hr, the second solution including oleate complex compounds including gadolinium oleate was prepared (complex compound formation step).

By mixing the second solution and the third solution containing oleic acid and 1-octadecene and adding the beta (β)-NaY$_{0.2}$Gd$_{0.6}$F$_4$:Yb$^{3+}$$_{0.18}$,Er$^{3+}$$_{0.02}$ prepared in the above 1. to the solution containing gadolinium and stirring them with a magnetic stirrer, the forth solution was prepared (the first reactive solution preparation step).

By adding 10 ml of methanol solution including 2.5 mmol of sodium hydroxide and 4 mmol of ammonium fluoride and stirring them with a magnetic stirrer, the first reactive solution was prepared.

After removing methanol from the first reactive solution, heat treatment of the methanol removed reactive solution was performed under argon gas condition at 300° C. for 90 min. During the heat treatment, nanophosphors having core/shell structure represented as β-NaY$_{0.2}$Gd$_{0.6}$F$_4$:Yb$^{3+}$$_{0.18}$, Er$^{3+}$$_{0.02}$/β-NaGd$_{0.8}$F$_4$:Ce$^{3+}$$_{0.15}$,Tb$^{3+}$$_{0.05}$ (nanophosphor preparation step).

The core/shell structure nanophosphors were washed with ethanol, dispersed and stored in hexane.

MEASUREMENT EXAMPLE

Physical Property Measurement of Comparative Example 1 (Nanoparticle) and Working Example 1 (Nanophosphor)

By using the beta (β)-NaY$_{0.2}$Gd$_{0.6}$F$_4$:Yb$^{3+}$$_{0.18}$,Er$^{3+}$$_{0.02}$ nanoparticles prepared in the above Preparation Example 1. as Comparative Example 1, and the nanophosphors having core/shell structure represented as beta(β)-NaY$_{0.2}$Gd$_{0.6}$F$_4$:Yb$^{3+}$$_{0.18}$,Er$^{3+}$$_{0.02}$/beta (β)-NaGd$_{0.8}$F$_4$:Ce$^{3+}$$_{0.15}$,Tb$^{3+}$$_{0.05}$ prepared by the above Preparation Example 2, below physical properties were measured.

MEASUREMENT EXAMPLE 1

Particle Diameter and Crystalline Property of Comparative Example 1 and Working Example 1

By using the Comparative Example 1 (β-NaY$_{0.2}$Gd$_{0.6}$F$_4$: Yb$^{3+}$$_{0.18}$,Er$^{3+}$$_{0.02}$ nanoparticles) and the Working Example 1 (core/shell structure nanophosphors represented as β-NaY$_{0.2}$Gd$_{0.6}$F$_4$:Yb$^{3+}$$_{0.18}$,Er$^{3+}$$_{0.02}$/β-NaGd$_{0.8}$F$_4$:Ce$^{3+}$$_{0.15}$, Tb$^{3+}$$_{0.05}$) as samples, TEM images and HRTEM images of them were taken to assess their crystallinity. For the TEM images and HRTEM images, TECNAI G2 model of FEI was used.

Figure 2:
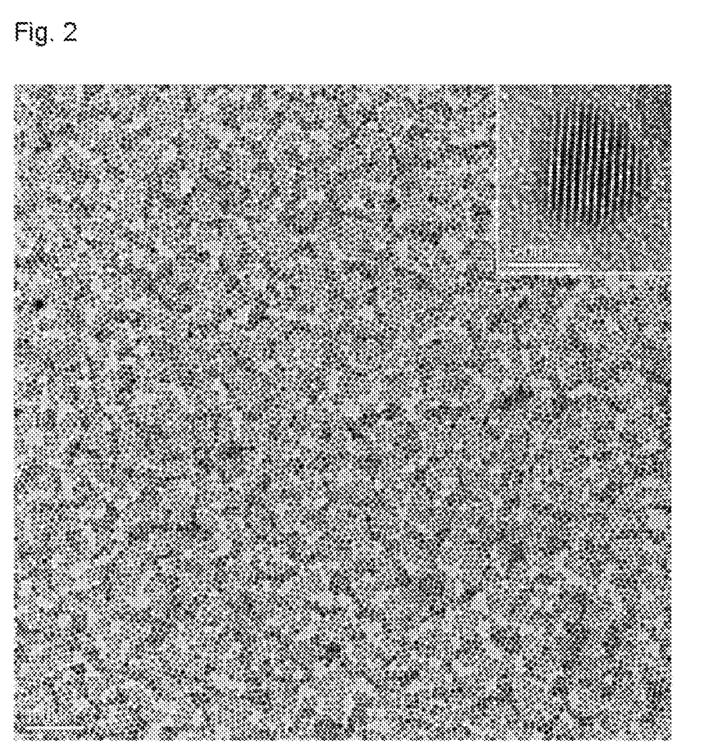
FIG. 2 is a TEM (Transmission Electron Microscope) image and an HRTEM (High Resolution Transmission Electron Microscope) image (top on the right) of Comparative Example 1 ($\beta$-$NaY_{0.2}Gd_{0.6}F_4$:$Yb^{3+}{}_{0.18}$,$Er^{3+}{}_{0.02}$ nanoparticle)

FIG. 2 is a TEM (Transmission Electron Microscope) image and an HRTEM (High Resolution Transmission Electron Microscope) image (top on the right) of Comparative Example 1 (β-NaY$_{0.2}$Gd$_{0.6}$F$_4$:Yb$^{3+}$$_{0.18}$,Er$^{3+}$$_{0.02}$ nanoparticle). Referring to the FIG. 2, it was found that the nanoparticles were about 8.3 nm in diameter and had distinct lattice pattern. This distinct lattice pattern indicates that the nanoparticles have very high crystallinity.

Figure 3:
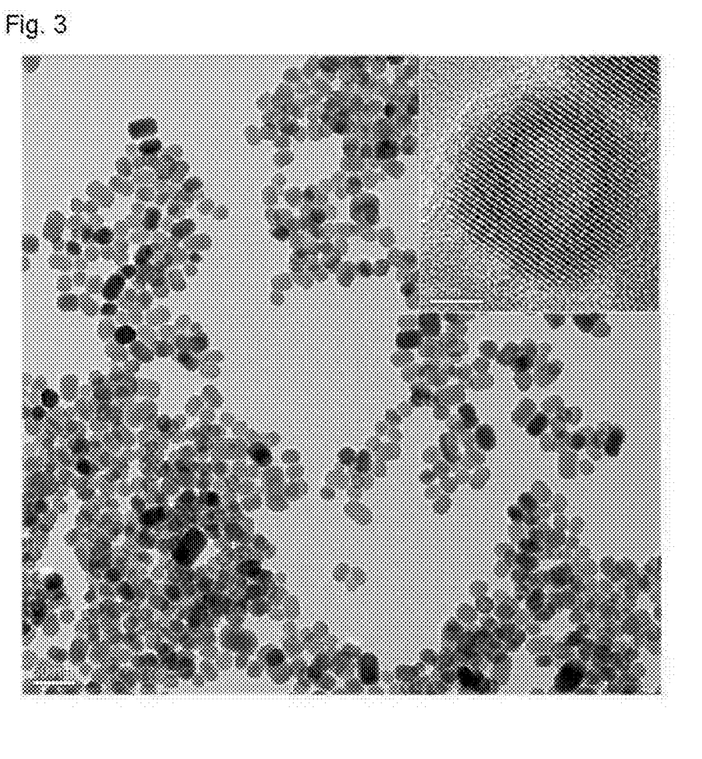
FIG. 3 is a TEM (Transmission Electron Microscope) image and an HRTEM (High Resolution Transmission Electron Microscope) image (top on the right) of Example 1 (nanophosphor having core/shell structure represented as $\beta$-$NaY_{0.2}Gd_{0.6}F_4$:$Yb^{3+}{}_{0.18}$,$Er^{3+}{}_{0.02}$/$\beta$-$NaGd_{0.8}F_4$:$Ce^{3+}{}_{0.15}$, $Tb^{3+}{}_{0.05}$)

FIG. 3 is a TEM (Transmission Electron Microscope) image and an HRTEM (High Resolution Transmission Electron Microscope) image (top on the right) of Working Example 1 (nanophosphor having core/shell structure represented as β-NaY$_{0.2}$Gd$_{0.6}$F$_4$:Yb$^{3+}$$_{0.18}$,Er$^{3+}$$_{0.02}$/β-NaGd$_{0.8}$F$_4$:Ce$^{3+}$$_{0.15}$,Tb$^{3+}$$_{0.05}$). Referring to the FIG. 3, it was found that a shell was formed around the core which was nanoparticle and the diameter of nanophosphor was enlarged to about 18.9~27.2 nm, compared with the diameter of nanophosphor without shell. In addition from display of the distinct lattice pattern, it was identified that it had very high crystallinity.

In general, a phosphor shows strong light emission when its host material's crystallinity is high. Therefore, it was suggested that both the nanoparticles of Comparative Example 1 and the nanophosphors of Working Example 1 had very excellent light emission property from the high crystallinity.

MEASUREMENT EXAMPLE 2

Light Emitting Spectrum of Comparative Example 1 and Working Example 1 Under Near IR and UV Light By using the Comparative Example 1 (β-NaY$_{0.2}$Gd$_{0.6}$F$_4$: Yb$^{3+}$$_{0.18}$,Er$^{3+}$$_{0.02}$ nanoparticles) and the Working Example 1 (core/shell structure nanophosphors represented as β-NaY$_{0.2}$Gd$_{0.6}$F$_4$:Yb$^{3+}$$_{0.18}$,Er$^{3+}$$_{0.02}$/β-NaGd$_{0.8}$F$_4$:Ce$^{3+}$$_{0.15}$, Tb$^{3+}$$_{0.05}$) as samples, emission spectrum were measured under near IR and UV light excitations. All the light emission spectra were measured with Hitachi F7000.

Figure 4:
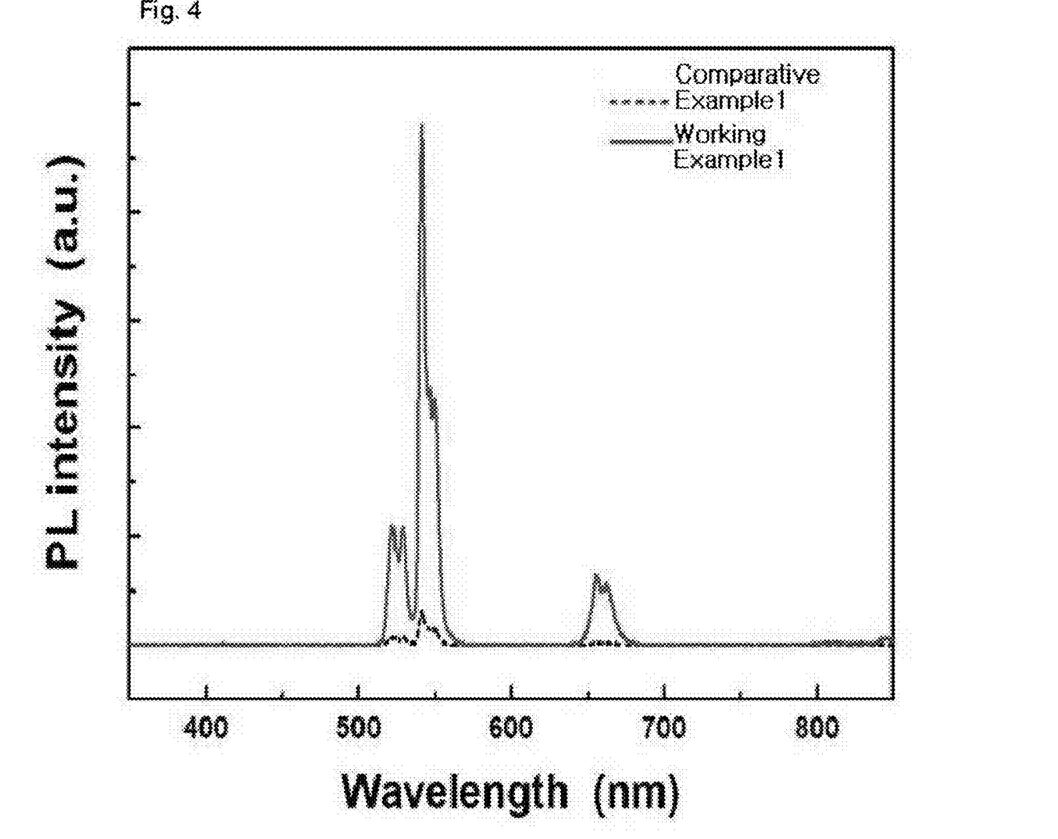
FIG. 4 is a graph showing photoluminescence (PL) spectra of Comparative Example 1 (dotted line) and Example 1 (solid line) measured by using near infrared rays as an excitation source.

FIG. 4 is a graph showing light emission spectrum of Comparative Example 1 (dotted line) and Working Example 1 (solid line) measured by using near infrared rays as an excitation source.

Referring to the FIG. 4, it was identified that the case in Working Example 1 showed at least about ten times stronger light emission intensity than Comparative Example 1. This means that in the light emission spectrum by using near infrared rays as an excitation source, the nanophosphor further including the Ce$^{3+}$ and Tb$^{3+}$ co-doped fluoride-based compound as a shell (Working Example 1) has much higher light emission intensity than nanoparticles without Ce$^{3+}$ and Tb$^{3+}$ co-doped fluoride-based compound (Comparative Example 1).

Figure 5:
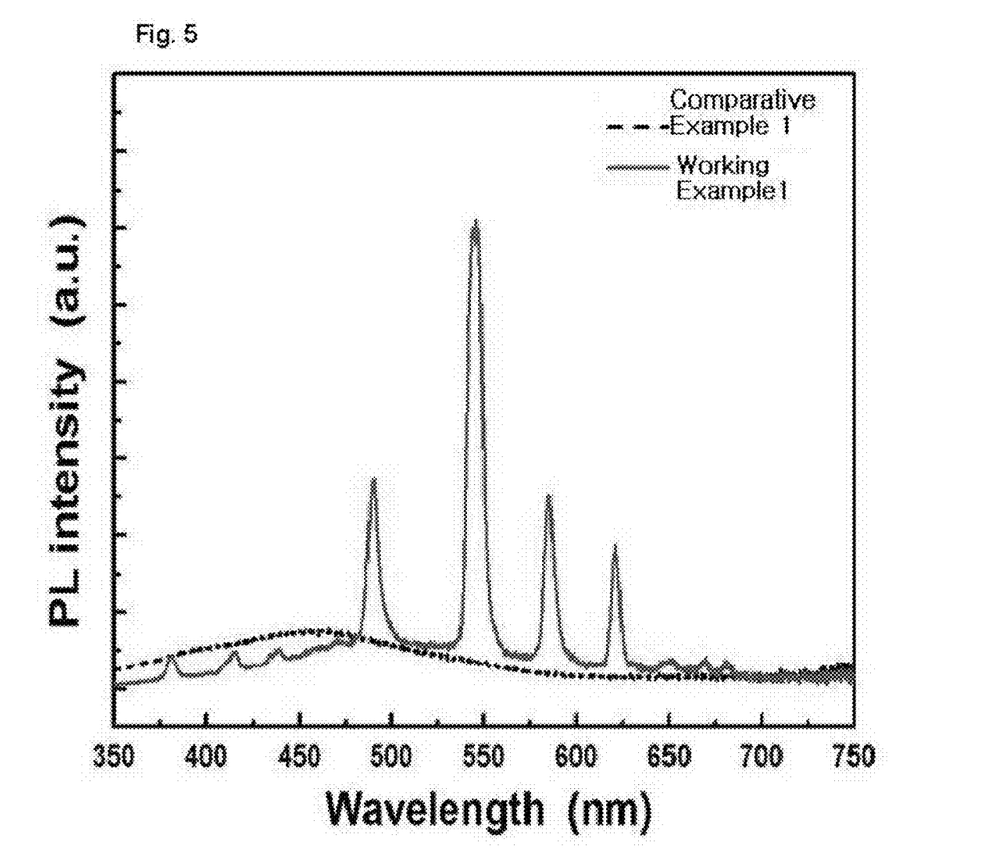
FIG. 5 is a graph showing light emission spectrum of Comparative Example 1 (dotted line) and Example 1 (solid line) measured by using ultraviolet rays as an excitation source.

FIG. 5 is a graph showing light emission spectrum of Comparative Example 1 (dotted line) and Working Example 1 (solid line) measured by using UV rays as an excitation source.

Referring to the FIG. 5, it was found that while the Working Example 1 showed light emission peaks in green range, the Comparative Example showed no light emission peak. Therefore, it was suggested that the Working Example 1 had both light emission properties of up-conversion and down-conversion.

MEASUREMENT EXAMPLE 3

Light Emission Assessment of Working Example 1 at Near IR and UV

Using the Working Example 1 (core/shell structure nanophosphors represented as $\beta$-NaY$_{0.2}$Gd$_{0.6}$F$_4$:Yb$^{3+}_{0.18}$, Er$^{3+}_{0.02}$/$\beta$-NaGd$_{0.8}$F$_4$:Ce$^{3+}_{0.15}$,Tb$^{3+}_{0.05}$) as a sample, its light emission degree using IR and UV rays as excitation sources was assessed with naked eyes.

Figure 6:
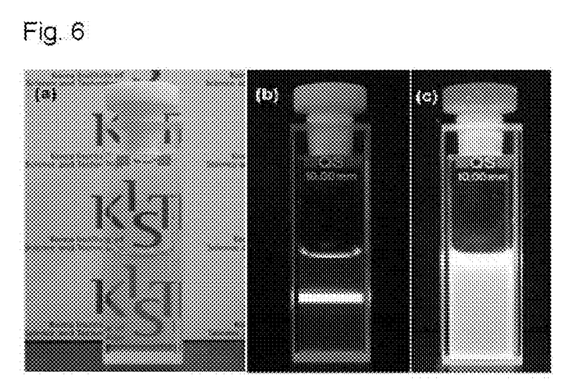

In FIG. 6, (a) on the left is a photo showing nanophosphor dispersed solution in the Working Example 1, (b) on the center is a photo showing light emission using near infrared rays as an excitation source, and (c) on the right is a photo showing light emission using ultraviolet rays as an excitation source. Referring to the photos of FIG. 6, it was identified that the nanophosphor dispersed solution of the Working Example 1 was highly transparent solution and when it was excited by IR and UV rays, it showed distinct green light emission property.

MEASUREMENT EXAMPLE 4

Magnetic Hysteresis Experiment of Example 1

Figure 7:
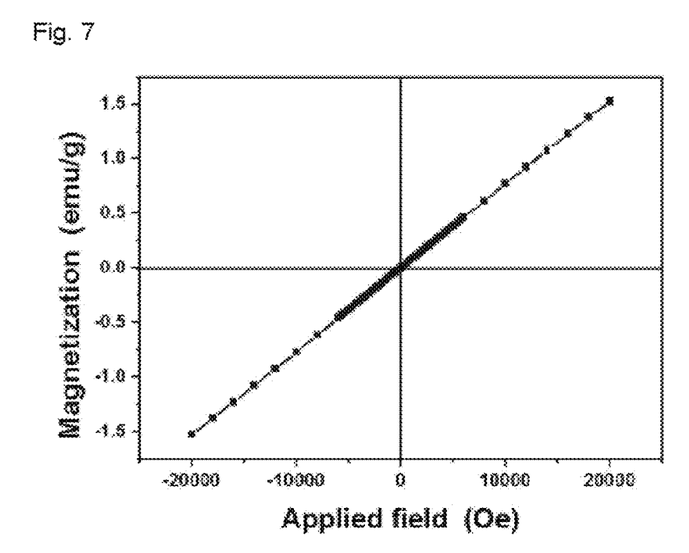
FIG. 7 is a graph showing the magnetic hysteresis curve measured by the sample synthesized in the Example 1.

Using the Working Example 1 (core/shell structure nanophosphors represented as $\beta$-NaY$_{0.2}$Gd$_{0.6}$F$_4$:Yb$^{3+}_{0.18}$,Er$^{3+}_{0.02}$/$\beta$-NaGd$_{0.8}$F$_4$:Ce$^{3+}_{0.15}$,Tb$^{3+}_{0.05}$) as a sample, its hysteresis curve was measured and shown in FIG. 7. The magnetic hysteresis curve was measured using Micro Mag 2900 model of Princeton. Referring to the FIG. 7, it was identified that the nanophosphors in the Working Example 1 showed paramagnetic property.

Figure 8:
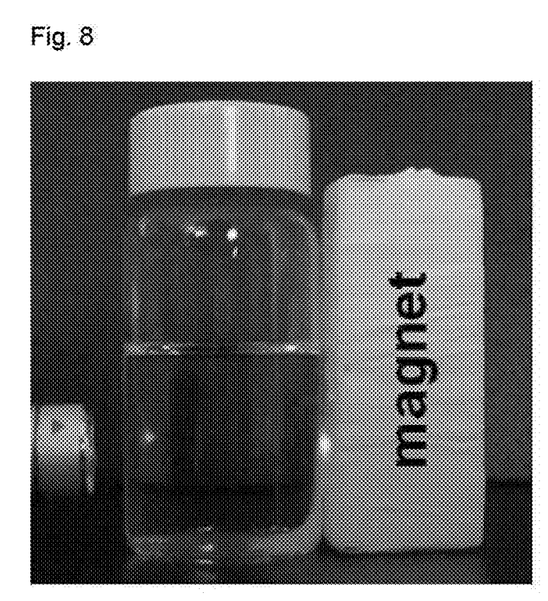
FIG. 8 is a photo showing light emission of the nanophosphor in the Example 1 when a permanent magnet exists.

FIG. 8 is a photo showing light emission of the nanophosphor in the Working Example 1 when a permanent magnet exists. Referring to the FIG. 8, it was identified that due to its magnetic property, nanophosphors of the Working Example 1 moved to around the permanent magnet and light emission was shown only in the areas where the particles were clustered around the magnet.

Referring to these above Measurement Examples, it was identified that the nanophosphor of the present invention showed excellent light emission properties using IR and UV rays as excitation source and had good paramagnetic property concomitantly, so it could be applied as a good contrast agent with good contrast and accuracy. Furthermore, the nanophosphors of the present invention can be included and applied to UV sensor, IR sensor, counterfeit prevention code, and solar cell.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A nanophosphor, comprising:
   a core which comprises nanoparticles comprising a second compound of Formula 2, and
   a shell which comprises a first compound and covers the core, wherein the first compound is fluoride-based which is co-doped with Ce$^{3+}$ and Tb$^{3+}$, $$NaGd_{1-p-q-r}M_rF_4:Ce^{3+}_p,Tb^{3+}_q \quad (1)$$

wherein, p is a real number in the range of $0.01 \leq p \leq 0.5$; q is a real number in the range of $0.001 \leq q \leq 0.35$; r is a real number in the range of $0 \leq r < 1$; $0.011 \leq p+q+r < 1$; and $p > q$;
   M is selected from the group consisting of Y, La, Pr, Nd, Pm, Sm, Eu, Dy, Ho, Er, Tm, Yb, Lu, and combination thereof,
   wherein the second compound is fluoride-based which is co-doped with Yb$^{3+}$ and Er$^{3+}$, $$NaY_{1-w-z-x-y}Gd_wL_zF_4:Yb^{3+}_x,Er^{3+}_y \quad (2)$$

wherein, x is a real number in the range of $0.1 \leq x \leq 0.9$; v is a real number in the range of $0 < y \leq 5\ 0.1$; and $0.1 < x+y \leq 1$;
   w is a real number in the range of $0 \leq w \leq 1$; z is a real number in the range of $0 \leq z \leq 1$; and $0.1 < x+y+w+z \leq 1$; and
   L is selected from the group consisting of lanthanide elements and combination thereof.

2. The nanophosphor according to claim 1, wherein the nanophosphor is 1~50 nm in diameter.

3. The nanophosphor according to claim 1, wherein the nanoparticle has hexagonal structure.

4. The nanophosphor according to claim 1, wherein the first compound has crystalline structure.

5. The nanophosphor according to claim 1, wherein the core is 1~30 nm in diameter.

6. The nanophosphor according to claim 1, the nanophosphor is characterized in having down-conversion light emission properties and up-conversion light emission properties.

7. A method for preparing a nanophosphor defined in claim 1, comprising:
   (a) preparing a fifth solution comprising yttrium precursors, ytterbium precursors, erbium precursors, oleic acid, and 1-octadecene;
   (b) preparing a sixth solution comprising lanthanide complex compounds by heating the fifth solution;
   (c) preparing a second reaction solution by mixing the sixth solution and a seventh mixed solution comprising sodium precursors and fluorine precursors;
   (d) forming nanoparticles comprising a second compound of Formula 2 by heat treatment of the second reaction solution, wherein the second compound is fluoride-based one which is co-doped with Yb$^{3+}$ and Er$^{3+}$, $$NaY_{1-w-z-x-y}Gd_wL_zF_4:Yb^{3+}_x,Er^{3+}_y \quad (2)$$

wherein, x is a real number in the range of $0.1 \leq x \leq 0.9$; y is a real number in the range of $0 < y \leq 0.1$; and $0.1 < x+y \leq 1$;
   w is a real number in the range of $0 \leq w \leq 1$; z is a real number in the range of $0 \leq z \leq 1$; and $0.1 < x+y+w+z \leq 1$;
   L is one selected from the group consisting of lanthanide elements and combination thereof;
   (e) preparing a first solution comprising gadolinium precursors, cerium precursors, terbium precursors, and oleic acid salts;
   (f) preparing a second solution comprising lanthanide complexes by heat treatment of the first solution;
   (g) preparing a first reaction solution by mixing a forth solution with sodium precursors and fluorine precursors, wherein the forth solution is prepared by blending a third solution comprising oleic acid and 1-octadececen, a mixture comprising the second solution, and the nanoparticles formed in step (d); and (h) preparing nanophosphors comprising a first compound of Formula 1 by heat treatment of the first reaction solution and thereby a core containing the nanoparticles is covered with a shell containing the first compound, wherein, p is a real number in the range of $0.01 \leq p \leq 0.5$; q is a real number in the range of $0.001 \leq q \leq 0.35$; r is a real number in the range of $0 \leq r < 1$; $0.011 \leq p+q+r < 1$; and p>1; and M is one selected from the group consisting of Y, La, Pr, Nd, Pm, Sm, Eu, Dy, Ho, Er, Tm, Yb, Lu, and combination thereof.

8. The method according to claim 7, wherein the heat treatment in the step (h) is performed at 200~370° C.

9. The method according to claim 7, wherein the gadolinium precursor is one selected from the group consisting of gadolinium acetate ($Gd(CH_3COO)_3$), gadolinium chloride ($GdCl_3$), gadolinium chloride hexahydrate ($GdCl_3.6H_2O$) and combination thereof, the cerium precursor is one selected from the group consisting of cerium acetate ($Ce(CH_3COO)_3$), cerium chloride ($CeCl_3$), ceriumchloride heptahydrate ($CeCl_3.7H_2O$) and combination thereof, and the terbium precursor is one selected from the group consisting of terbium acetate ($Tb(CH_3COO)_3$), terbium acetate tetrahydrate ($Tb(CH_3COO)_3.4H_2O$), terbium chloride ($TbCl_3$), terbium chloride hexahydrate ($TbCl_3.6H_2O$), and combination thereof.

10. The method according to claim 7, wherein the first solution further comprises a lanthanide precursor selected from the group consisting of Y, La, Pr, Nd, Pm, Sm, Eu, Dy, Ho, Er, Tm, Yb, Lu and combination thereof.

11. A fluorescent or magnetic resonance imaging contrast agent comprising the nanophosphor according to claim 1.

12. An infrared sensor comprising the nanophosphor according to claim 1.

13. A counterfeit prevention code comprising the nanophosphor according to claim 1.

14. A solar cell comprising the nanophosphor according to claim 1.

* * * * *